W. MONTSTORM.
Apparatus for Aging Liquors.
No. 196,373. Patented Oct. 23, 1877.
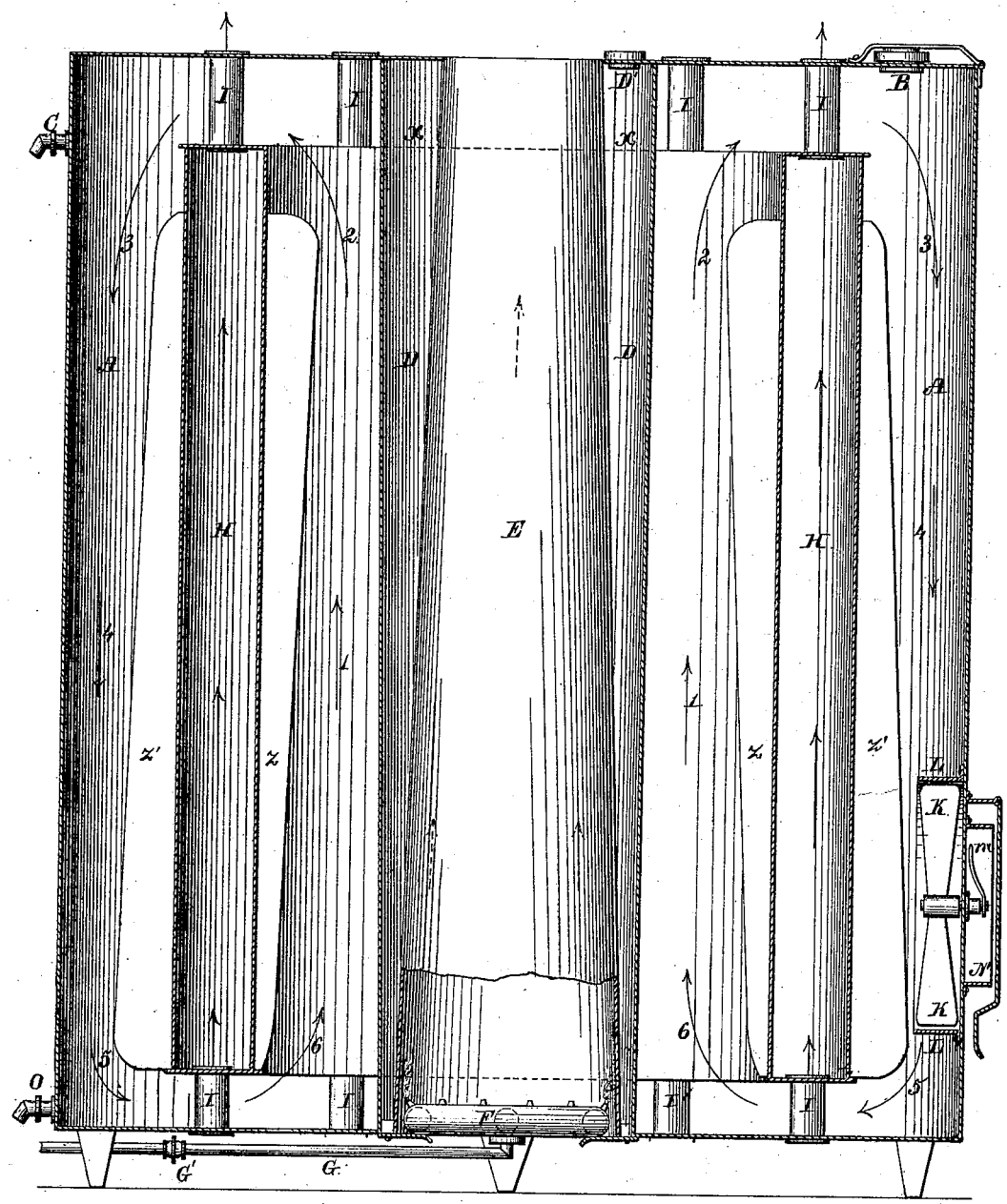
Attest
A. Le Prevost
M. Le Prevost
Inventor.
Wm. Montstorm

UNITED STATES PATENT OFFICE.

WILLIAM MONT STORM, OF NEW YORK, N. Y.

IMPROVEMENT IN APPARATUS FOR AGING LIQUORS.

Specification forming part of Letters Patent No. 196,373, dated October 23, 1877; application filed August 3, 1877.

*To all whom it may concern:*

Be it known that I, WM. MONT STORM, of the city and State of New York, have invented an Improved Machine or Apparatus for Ripening or Aging Liquors, of which the following is a specification:

The accompanying drawing represents a vertical section of my machine or apparatus so far in full detail as is necessary to show all its parts and their relations to each other.

As liquors may be rapidly improved or "aged" by agitation in a closed vessel, while simultaneously heated to about 120° Fahrenheit, I will proceed to the description of my improved machine or apparatus designed for this purpose.

A is the main body or outer shell, which is to contain the liquor to be treated. The entire apparatus may preferably be made of sheet-copper.

The liquor may be put into A through an afterward tightly capped and latched opening at B until it shall drip out of the cock C, when this, in turn, is to be closed.

D is a cylindrical vessel or chamber, constituting an integral and fixed portion of the treating apparatus as a whole, and is to be charged with water up to about the dotted line *x x*, or about on a level with C. From D, at D', projects a short capped tube or neck, through which D may be sufficiently charged with water. Centrally up through D extends a tapering flue, E, against the interior of which impinge the flames from a circular row of wicks of a suitably-arranged lamp, or, preferably, from a circular row of short gas-burners projecting from an annular supply-chamber, F. The supply of gas to the latter passes through pipe G, and may be regulated by cock G'.

The liquor in A nearest to D, being that portion first heated, rises above its previous level opposite to C, and flows outwardly toward the exterior shell of the tank, and, losing some of its heat, it then flows downward and inward again slowly toward D, thereby again getting an increase of temperature, and flowing upward, as before, and so on, following the course indicated by the arrows 1 2 3 4 5 6 on the drawing, all as will be understood.

I have found, however, by actual experimental trial, that the upward and downward currents, unless absolutely separated, tend to neutralize each other's flow, not only by their opposite directions of movement, but (through partial admixture) by their becoming too much equalized in temperature. To secure this separation of the upward and downward currents, I have a double-shelled or hollow-walled cylindrical partition, so to term it, H, extending entirely around within the tank, and about midway between its outer shell and D, and extending downward to within a short distance of the bottom of the tank, and upward to nearly the same distance from its top, or nearly to what would be the proper level of the liquor preparatory to the commencement of its treatment. This hollow partition is so closed at its top and bottom, as elsewhere, as to prevent any liquor from getting into it between its shells. From its top extend upward to and through the top of the tank, and from its bottom extend downward to and through the bottom of the tank, a number of tubes, I, to permit a flow of air up through it, thus still further preventing direct communication of temperature from the upward to the downward flowing liquor, which would proportionately tend to deaden its circulation and agitation, all as will be understood.

To still further secure agitation of the liquor during its circulation, as explained, I have, on the side of H next to D, equidistant flanges Z, standing at an angle, or, in other words, somewhat spirally, to its length, and on the outside of H are counterpart flanges Z', spiraling, so to express it, in the opposite direction. These effect in the liquor, during its upward and downward flow, a considerable whirl, and thereby a still greater agitation of it, as is desirable.

K is a little paddle-wheel, by which the rapidity of circulation of the liquor in the tank is indicated, so that the degree of heat on which this circulation of the liquor depends may be regulated from time to time, as may be deemed desirable. To explain more fully this device: Little more than half-way round K, but not touching it, extends a curb, L, attached to the shell of the tank. From the hub of K extends, through the side of the tank, and through a small sleeve projecting from it, a small shaft, to which is fastened a pointer, M, and which, turning with the wheel, shows, by its turning fast or slow, the corresponding rapidity of circulation of the liquor.

The curb L, it will be understood, is to prevent the downward current of the liquor from acting on the corresponding side of the wheel, and therefore on both sides at once, and so neutralizing any tendency to its turning at all. To protect the pointer M from injury, it is surrounded by a case, N, having a hinged cover, as shown. O is the draw-off cock of the tank.

I claim as my invention—

1. The combination, with the tank A as a whole, of the double-shelled or hollow-walled cylindrical partition H, substantially as and for the purpose set forth.

2. The combination, with the partition H, of the inclined or spiraling flanges Z Z', substantially as and for the purpose hereinbefore set forth.

3. The combination, with the tank A as a whole, of the wheel K, with its curb L, and carrying on its shaft the pointer M, all substantially as and for the purpose hereinbefore set forth.

WM. MONT STORM.

Witnesses:
 M. L. PREVOST,
 A. L. PREVOST.